Figure 1:
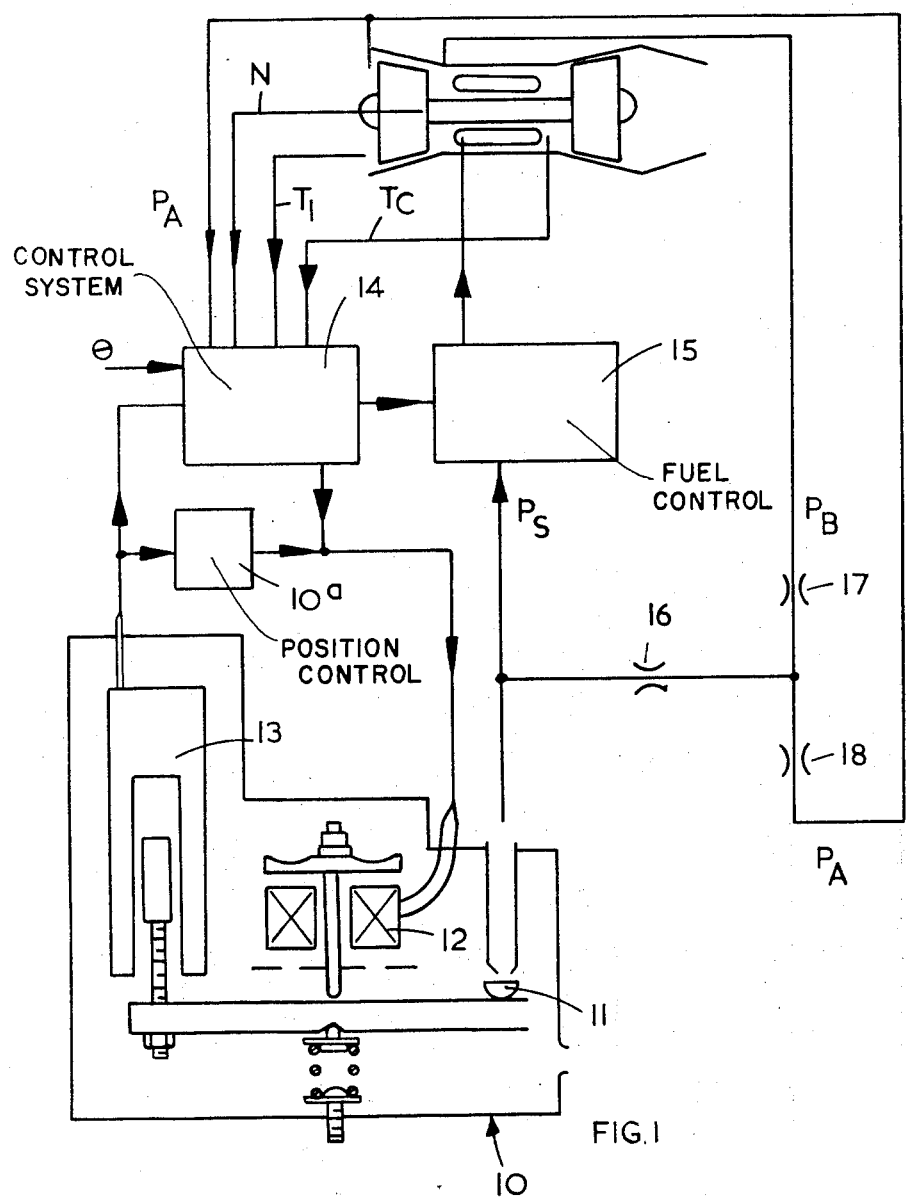

United States Patent [19]
Burrage

[11] 3,820,321
[45] June 28, 1974

[54] ACCELERATION CONTROL FOR GAS TURBINE ENGINE

[75] Inventor: Robert Graham Burrage, Solihull, England

[73] Assignee: Joseph Lucas (Industries) Limited, Birmingham, England

[22] Filed: Apr. 17, 1972

[21] Appl. No.: 244,797

[30] Foreign Application Priority Data
Apr. 21, 1971  Great Britain .................... 10382/71

[52] U.S. Cl. .......................................... 60/39.28 R
[51] Int. Cl. .............................................. F02c 9/08
[58] Field of Search .................................. 60/39.28

[56] References Cited
UNITED STATES PATENTS

| | | | |
|---|---|---|---|
| 3,421,318 | 1/1969 | Falk | 60/39.28 R |
| 3,469,395 | 9/1969 | Spitsbergen | 60/39.28 R |
| 3,523,423 | 8/1970 | Young | 60/39.28 R |
| 3,653,206 | 4/1972 | Greune | 60/39.28 R |

*Primary Examiner*—Clarence R. Gordon
*Attorney, Agent, or Firm*—Holman and Stern

[57] ABSTRACT

An apparatus for controlling the acceleration of a gas turbine engine has a valve responsive to an electrical control signal to provide a servo pressure signal. The said electrical control signal is derived from engine operating conditions and there is also provided a control circuit responsive to these conditions to generate a further control signal corresponding to the calculated upper limit of acceptable fuel flow to the engine. The control circuit includes a discriminator whereby the signal representing the lower fuel flow is passed to the valve.

17 Claims, 2 Drawing Figures

ACCELERATION CONTROL FOR GAS TURBINE ENGINE

This invention relates to an apparatus for controlling the acceleration of a gas turbine engine.

Aircraft gas turbine engines are commonly used to provide power for auxiliary equipment. When the engines are operated at high altitudes the power demand of the auxiliary equipment may represent a substantial fraction of the total power available from the engine. In these conditions there will be an increased tendency for the engine to stall in response to a demand for acceleration. It is an object of the present invention to provide an acceleration control apparatus in which this disadvantage is reduced.

According to the invention an acceleration control apparatus for a gas turbine engine fuel control system in which variations in fuel flow to accelerate or decelerate the engine are responsive to variations from a predetermined level of a servo pressure signal $P_S$ comprises a fluid control valve 10 having a control element 11 movable in response to a first control signal $C_2$ to provide said servo pressure signal $P_S$, said servo pressure signal $P_S$ being at said predetermined level when said control element is in a datum position, means 13, 10a for generating a first electrical signal which is proportional to the displacement of said control element from said datum position, means 20,21,22,23,24 responsive to engine operating conditions to generate a second electrical signal $Y_1$ which is proportional to a calculated value of said displacement, and means 29 responsive to the difference between said first and second electrical signals for generating a supplementary control signal $C_1$ for overriding said first control signal.

Figure 2:
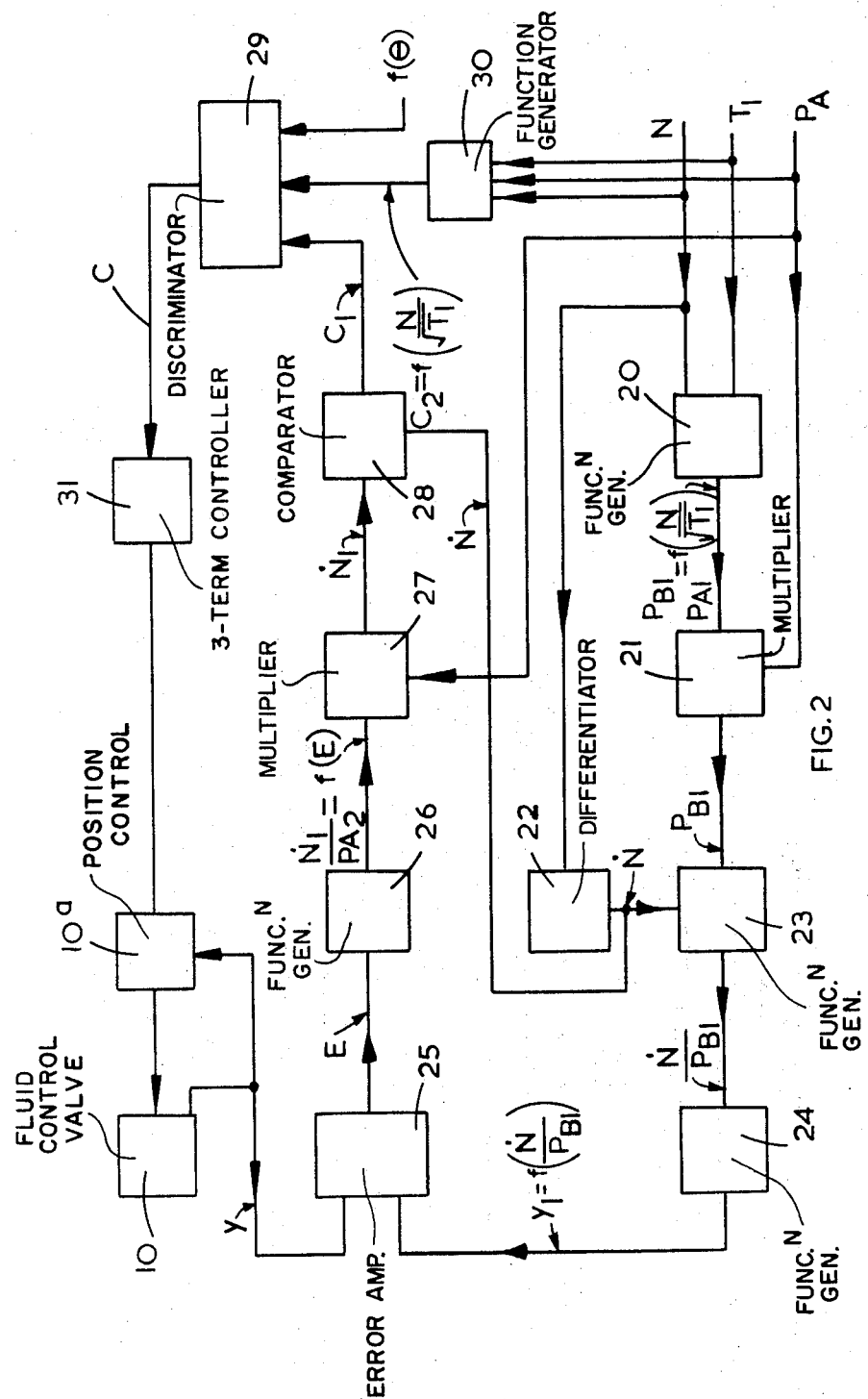

An example of the invention will now be described with reference to the accompanying drawings in which:

FIG. 1 shows a diagram of an arrangement for providing a servo pressure signal, and FIG. 2 is a block diagram of an electrical control system for FIG. 1.

Referring first to FIG. 1, a fluid flow control valve, shown generally at 10, has an associated position control circuit 10a substantially as described in German Pat. Publication No. 2,151,433. Valve 10 also includes a half-ball closure member 11 positioned by an electro-magnet 12. The position of the half-ball 11 is sensed by a transducer 13. Electro-magnet 12 is supplied with an electrical control signal of varying magnitude and derived in a manner later to be described from an electrical control system, shown generally at 14.

Valve 10 controls an airflow to provide a servo pressure signal $P_S$ to a fuel control system, shown generally at 15. Air flow to valve 10 is obtained via a restrictor 16 from an air potentiometer formed by restrictors 17,18. Air pressure signals $P_A$, $P_B$, derived from locations on the engine compressor, are applied to opposite ends of the air potentiometer.

The fuel control system 15 is such that a predetermined value of the servo pressure signal $P_S$ results in a fuel supply to the engine which corresponds to a steady running condition, and an increase or decrease in the value of the servo pressure signal $P_S$ results in corresponding acceleration and deceleration of the engine. The said predetermined value of pressure $P_S$ occurs at a datum position of half ball 11, this datum position being at a point approximately half way between the extremes of travel of ball 11.

The fuel control system 15 is also responsive to electrical control signals from the electrical control system 14. System 14 receives input signals from the engine, as for example intake temperature $T_1$, shaft speed N, combustion temperature $T_C$, compressor intake pressure $P_A$ and the position $\theta$ of a pilot's control lever.

A block diagram of control system 14 is shown in FIG. 2. A function generator 20 is arranged to receive electrical input signals N,$T_1$ respectively proportional to shaft speed and intake temperature. Function generator 20 provides an output signal proportional to the ratio of calculated values $P_{B1}$, $P_{A1}$ of pressures $P_B$ and $P_B$ respectively which correspond to a function of $N/\sqrt{T_1}$. The calculated value $P_{A1}$ is substantially identical to the actual value of a signal proportional to pressure $P_A$. The output of function generator 20 is connected to the input of a multiplier 21 to which the signal proportional to $P_A$ is also supplied. The output from multiplier 21 thus represents $P_{B1}$.

The engine speed signal is supplied to a differentiator 22 whose output $\dot{N}$ is supplied to a function generator 23, together with the $P_B1$ signal from multiplier 21, to provide a signal which represents the value $\dot{N}/P_{B1}$. The $\dot{N}/P_{B1}$ signal provides an input for a further function generator 24 which provides a signal representing the calculated displacement Y1 of the half ball 11 of valve 10 from its datum position, Y1 being a function of $\dot{N}/P_{B1}$. The Y1 signal is supplied to one input of an error amplifier 25 whose other input is supplied by the output signal Y from the transducer 13 of valve 10.

An output signal E from error amplifier 25 thus represents the difference between Y and Y1, and is applied to a function generator 26. Function generator 26 provides, for any value of E, a corresponding signal which represents an upper permitted limit of the ratio $\dot{N}_1/PAhd 2$, where $\dot{N}_1$ and $PA_2$ are calculated values corresponding to $\dot{N}$ and PA respectively.

The output signal from function generator 26 is supplied to a multiplier 27. Multiplier 27 is also supplied with the signal proportional to pressure PA, and provides an output signal corresponding to an upper limiting value of $\dot{N}_1$. The $\dot{N}_1$ signal is supplied to a comparator 28 to which the $\dot{N}$ signal from differentiator 22 is also supplied. The output signal $C_1$ from comparator 28 thus corresponds to the difference between the upper limiting value $\dot{N}_1$ of acceleration for the prevailing engine conditions and the actual value $\dot{N}$ of engine acceleration. The magnitude of signal $C_1$ corresponds to a demand for fuel flow which will accelerate the engine by the maximum permissible amount for the aforesaid engine conditions. Signal $C_1$ forms one input to a discriminator circuit 29.

A function generator 30 provides, for values of $P_A$, $T_1$ and N, electrical output signals $C_2$ which are dependent on the ratio $N/\sqrt{T_1}$ of values obtained from the engine. Signal $C_2$ represents an upper permissible limit of fuel demand for the values $P_A$, N, $T_1$ and provides a further input for discriminator circuit 29.

Because of increased tendency of the engine to stall when operating at high altitude and when providing power for auxiliary equipment the fuel flow demanded by signal $C_1$ is arranged to be less than that demanded by signal $C_2$.

Discriminator circuit 29 has additional inputs provided by signals corresponding to desired upper limits of one or more engine operating parameters, as for example the position $\theta$ of the pilot's control lever. Circuit 29 is such that its output signal C is provided by whichever of its inputs would require the smallest fuel flow to the engine. Signal $C_1$ thus overrides signal $C_2$. The electrical control signal supplied to the electromagnet 12 of valve 10 is dependent on the magnitude of output signal C.

Signal C is supplied to the position control circuit 10a via a circuit 31 of a known type which includes proportional, derivative and integral control functions to provide adequate response, stability and damping.

I claim:

1. An acceleration control apparatus for a gas turbine engine fuel control system in which variations in fuel flow to accelerate or decelerate the engine are responsive to variations from a predetermined level of a servo pressure signal, comprising a fluid control valve having a control element movable in response to a first control signal to provide said servo pressure signal, said servo pressure signal being at said predetermined level when said control element is in a datum position, means for generating a first electrical signal which is proportional to the displacement of said control element from said datum position, means responsive to engine operating conditions to generate a second electrical signal which is proportional to a calculated value of said displacement, and means responsive to the difference between said first and second electrical signals for generating a supplementary control signal for overriding said first control signal.

2. An apparatus as claimed in claim 1 which includes means for generating said first control signal in response to a plurality of parameters derived from the engine.

3. An apparatus as claimed in claim 2 in which said first control signal represents an upper permissible limit of fuel flow for the corresponding values of said parameters.

4. An apparatus as claimed in claim 1 in which the means for generating said first electrical signal comprises a position transducer.

5. An apparatus as claimed in claim 1 in which said servo pressure signal is dependent on first and second signal pressures derived from the engine compressor.

6. An apparatus as claimed in claim 5 which includes an air potentiometer subjected at its opposite ends to said first and second signal pressures, said servo pressure signal being derived from an intermediate point of said potentiometer.

7. An apparatus as claimed in claim 5 in which the means for generating the second electrical signal comprises a first function generator for providing a first output signal proportional to the ratio of calculated values of said first and second signal pressures.

8. An apparatus as claimed in claim 7 which includes means for multiplying said first output signal by a signal proportional to one of said signal pressures.

9. An apparatus as claimed in claim 8 which includes means for differentiating a signal proportional to the speed of the engine and a second function generator for providing a second output signal proportional to the ratio of said differentiated signal and an output signal from said multiplying means.

10. An apparatus as claimed in claim 9 which includes a third function generator responsive to said second output signal to provide said second electrical signal.

11. An apparatus as claimed in claim 7 in which the means responsive to the difference between the first and second electrical signals comprises a fourth function generator providing a third output signal proportional to the ratio between a calculated value of engine acceleration and a calculated value of one of said signal pressures.

12. An apparatus as claimed in claim 11 in which said difference responsive means includes means for multiplying said third output signal by a signal dependent on said one signal pressure, to provide a fourth output signal proportional to said calculated value of engine acceleration.

13. An apparatus as claimed in claim 12 in which said difference responsive means includes means responsive to the difference between said fourth output signal and a signal proportional to actual engine acceleration, to provide said supplementary control signal.

14. An apparatus as claimed in claim 1 which includes a discriminator circuit responsive to input signals provided by the first control signal and to the supplementary control signal to provide a fifth output signal for controlling said servo valve.

15. An apparatus as claimed in claim 14 in which said discriminator circuit comprises means for generating said fifth output signal in response to whichever of said first control signals or said supplementary control signals corresponds to the lower fuel flow to the engine.

16. An apparatus as claimed in claim 15 in which said discriminator circuit is responsive to at least one additional engine operating parameter.

17. An apparatus as claimed in claim 16 in which said additional parameter comprises the position of a control lever for the engine.

* * * * *